(12) United States Patent
Ramillon et al.

(10) Patent No.: US 6,990,419 B2
(45) Date of Patent: Jan. 24, 2006

(54) SYSTEM FOR IDENTIFYING A SIGNAL SOURCE

(75) Inventors: Pierre Ramillon, Brax (FR); Luc Collorec, Toulouse (FR); Henri Cassan, Tournefeuille (FR)

(73) Assignee: Airbus France S.A.S., Toulouse (FR)

( * ) Notice: Subject to any disclaimer, the term of this patent is extended or adjusted under 35 U.S.C. 154(b) by 40 days.

(21) Appl. No.: 10/717,466

(22) Filed: Nov. 21, 2003

(65) Prior Publication Data

US 2005/0060111 A1 Mar. 17, 2005

Related U.S. Application Data

(62) Division of application No. 10/368,535, filed on Feb. 18, 2003.

(30) Foreign Application Priority Data

Feb. 18, 2002 (FR) .................................. 02 01996

(51) Int. Cl.
*G06F 19/00* (2006.01)

(52) U.S. Cl. ............................ 702/76; 702/33; 702/76; 702/185; 702/189; 73/577; 73/583; 367/13; 701/111

(58) Field of Classification Search ............ 702/33–35, 702/39, 70–71, 76, 182, 185, 189; 73/577, 73/583; 367/13; 701/111
See application file for complete search history.

(56) References Cited

U.S. PATENT DOCUMENTS

| 4,036,057 A | * | 7/1977 | Morais | 73/587 |
| 4,603,584 A | * | 8/1986 | Bartle et al. | 73/599 |
| 5,804,726 A | * | 9/1998 | Geib et al. | 73/593 |
| 2001/0005821 A1 | * | 6/2001 | Ottosson | 702/185 |
| 2001/0049590 A1 | * | 12/2001 | Wegerich | 702/189 |
| 2002/0183971 A1 | * | 12/2002 | Wegerich et al. | 702/185 |
| 2003/0023393 A1 | * | 1/2003 | Oravecz | 702/39 |
| 2003/0028332 A1 | * | 2/2003 | DiMaggio et al. | 702/35 |
| 2003/0167140 A1 | | 9/2003 | Ramillon et al. | |
| 2003/0216889 A1 | * | 11/2003 | Marko et al. | 702/182 |
| 2003/0220767 A1 | * | 11/2003 | Wegerich | 702/182 |

OTHER PUBLICATIONS

U.S. Appl. No. 10/368,535, filed Feb. 18, 2003, Ramillon et al.
U.S. Appl. No. 10/717,643, filed Nov. 21, 2003, Ramillon et al.
U.S. Appl. No. 10/717,466, filed Nov. 21, 2003, Ramillon et al.

* cited by examiner

*Primary Examiner*—Marc S. Hoff
*Assistant Examiner*—Elias Desta
(74) *Attorney, Agent, or Firm*—Oblon, Spivak, McClelland, Maier & Neustadt, P.C.

(57) ABSTRACT

A system for identifying a signal source in a predetermined space, the system including multiple sensing units arranged at different locations to detect signals in the predetermined space. The system also includes one or more recording units arranged to separately and simultaneously record a detected signal at each of the sensing units that detects the signal. The system further includes a processing unit including a first storage area configured to store a set of identified signatures corresponding to multiple signal sources in the predetermined space, and a second storage area configured to store parameters related to the conditions under which the recordings of the signal are made. The processing unit also includes an identifying unit that is programmed to identify a signal source by comparing a determined signal spectrum with some or all of the signatures included in the set of identified signatures.

14 Claims, 6 Drawing Sheets

SYSTEM FOR IDENTIFYING A SIGNAL SOURCE

CROSS-REFERENCE TO RELATED APPLICATIONS

This application is a divisional application of allowed U.S. patent application Ser. No. 10/368,535, filed Feb. 18, 2003, which claims priority under 35 U.S.C. §119 to French Patent Application 02 01996, filed on Feb. 18, 2002, the entire disclosures of which are both incorporated herein by reference.

BACKGROUND OF THE INVENTION

1. Field of the Invention

The present invention relates to a method of identifying a signal, such as a source of sound, for example, and a device for implementing the method. The purpose of a method according to the invention is to identify the source of an unwanted noise (or other signal) in a machine, for example an aircraft, a road vehicle (automobile, truck, coach, etc.), a stationary industrial machine, etc.

2. Discussion of the Background

At present, in the case of an aircraft, unwanted noises are identified either before the aircraft is delivered by the manufacturer or when an unwanted noise appears during the operation of the aircraft by an airline. The expression "unwanted noise" refers to a noise that is perceptible in flight at an abnormal and unacceptable sound level. To identify the noise, a specialist in acoustics and aeronautical engineering is called in to identify the source of the unwanted noise during test flights. Using his knowledge and experience, the expert identifies the sources of unwanted noises that he hears. This "manual" and empirical procedure is effective but costly.

In a field related to the present invention, U.S. Pat. No. 4,884,449 and US-2001012981, for example, disclose methods based on using a sound recording. Specifically, the prior art describes the attempt to determine if a part of a machine, for example a bearing, is defective or not. Identifying the source of an unknown noise includes determining if a noise emitted by a known source has anomalies or not.

SUMMARY OF THE INVENTION

An object of the present invention is therefore to provide a method of identifying a source, in particular a sound source, without the intervention of a specialist.

To this end, the present invention proposes a method of identifying a source of a signal wherein the signal is recorded and then analyzed in order to determine its spectrum, which method includes the following steps:
  a) in parallel with recording the signal, storing parameters significant of the conditions under which the recording is made,
  b) after analyzing the signal and determining its spectrum, detecting lines emerging from the background noise of the signal, using a predetermined emergence threshold,
  c) comparing each line detected with some or all of a set of signatures of sources identified and inventoried in a database established prior to the recording, and
  d) for each line, and where applicable, selecting signatures that may correspond to the line and, as a function of the resulting signature/line pairs, consolidating, resolving ambiguity of, or quantifying the source corresponding to the line.

The signature/line pair is consolidated, where applicable, if only one signature is selected for the line, by the following steps:
  C1) modifying a measurement parameter,
  C2) comparing a recording corresponding to the modified parameter with the original recording, and
  C3) if the signal is modified as predicted in the signature retained by modifying the parameter, definitively retaining the signature for the line, and if it is not, quantifying the source corresponding to the line.

The resolving of ambiguity corresponding to a plurality of signatures is selected for a line and/or the same signature is selected for more than one line, and includes the following steps:
  D1) modifying a measuring parameter,
  D2) comparing a recording corresponding to the modified parameter with the original recording and analyzing the modification of the signal,
  D3) searching for signature/line pairs verifying a modification conforming to the observed modification, and
  D4) if only one signature/line pair verifies the observed modification, retaining that signature for the line in question, if a plurality of signature/line pairs verifies the modification, restarting the resolving of ambiguity by modifying another parameter, and if no signature/line pair verifies the modification, quantifying the source corresponding to the line.

The source corresponding to a line is quantified if no signature is selected for the line by the following steps:
  Q1) comparing the line with a greater number of signatures if the first comparison applied to only some of the signatures from the database,
  Q2) if a signature is then found, where applicable, carrying out a consolidation or resolving of ambiguity step, depending on the number of signatures found, and
  Q3) if not, and where applicable, carrying out additional measurements with different parameters.

An identification method of the above kind can identify the sources of recorded signals in most cases. Of course, the database containing the inventoried signatures must be adequately loaded beforehand.

The method has the advantage that it can be automated, for example using a microcomputer, and can then be used without the intervention of a specialist in acoustics or signal processing.

At a consolidation or resolving of ambiguity stage, the measurement parameter to be varied is preferably chosen automatically as a function of the characteristics of the selected signature(s). This can be achieved by software that chooses a parameter as a function of the selected signature (s). The parameter chosen is one which, when modified, influences the signal emitted by the assumed source.

In one advantageous embodiment of an identification method according to the invention, recordings are made at several different locations simultaneously. This provides measurements taken under exactly the same conditions at different locations. When such measurements are available it is advantageous, during a consolidation or resolving of ambiguity stage, for the first modified parameter to be the location at which the measurement was taken.

In a method according to the invention, the signatures stored in the database advantageously include information pertaining to the range of frequencies of the signal emitted by the corresponding source, the conditions under which the signal emitted by the corresponding source appears, and the effects of modifying one or more parameters. The information regarding the effects of modifying one or more parameters is particularly useful during the consolidation and quantification stages.

In an identification method according to the invention, the recorded signal is processed using a fast Fourier transform (FFT), for example, to produce a unique spectrum by weighting and averaging.

It is equally possible to generate a non-weighted spectrum and to correct the picket fence effect (PFE) before weighting is applied, and a power density spectrum (PDS) correction can be applied to the emergent lines of the spectrum.

The picket fence effect is caused by the fact that the FFT spectrum is a discrete spectrum providing information only at given frequencies that depend on the settings of the parameters of the Fourier transform applied. The real spectrum of the analyzed signal can have peaks at frequencies between the lines of the FFT spectrum. Thus the peaks of the FFT spectrum are not at exactly the right frequency. This is known as the picket fence effect. This evocative name refers to a comparison: looking at an FFT spectrum is compared to looking at a mountain range through a picket fence. A power density spectrum correction corrects the errors caused by the picket fence effect and can be applied to all types of measurement. The expression power density spectrum is a generic name and does not refer to the physical magnitude represented in time. The average is calculated of the squares of the values of the portion of the magnitude that passes through a narrowband filter with a given center frequency, per unit bandwidth, and as the bandwidth tends toward zero and time toward infinity.

In order to identify harmonics of a line quickly, in step b) of the identification method according to the invention the emergent lines are preferably detected in the increasing frequency direction.

The identification method according to the invention is applied, for example, to detecting signals inside transportation means such as an aircraft in flight, for example. In this case, the parameters recorded in step a) are advantageously aircraft flight parameters including the speed of the aircraft, its altitude, its flight phase (climb, cruising or descent) and the engine revs.

For detecting unwanted noises inside an aircraft in flight, the signal is preferably recorded during a stable flight phase over a time period from 5 to 30 seconds.

The method according to the invention can be applied to detecting unwanted noises from a sound source. It can also be used to detect vibrations, for example.

The present invention also relates to an aircraft including a device for identifying a source of a signal, the device including at least one sensor, means for recording the signal connected to the sensor or to each sensor to record separately the signals received by the sensor or each sensor, and signal processing and analyzing means for implementing a method according to the invention.

In the above kind of aircraft, the device for identifying a signal source advantageously has its own electrical power supply independent of the electrical power supply network of the aircraft. The means used to identify signal sources are then entirely independent of the aircraft and this limits the risk of those means influencing the recorded signals.

The means for processing and analyzing the signal include a microcomputer, for example.

If the signal to be identified in the aircraft is a noise coming from a sound source, the sensors are preferably microphones. The signal to be identified can also be a vibration. In this case the sensors are accelerometers, for example.

The details and advantages of the present invention will emerge more clearly from the following description, which is given with reference to the accompanying diagrammatic drawings.

BRIEF DESCRIPTION OF THE DRAWING(S)

The accompanying drawings, which are incorporated in and constitute a part of the specification, illustrate presently preferred embodiments of the invention, and together with the general description given above and the detailed description of the preferred embodiments given below, serve to explain principles and illustrate examples of the invention.

DESCRIPTION OF THE PREFERRED EMBODIMENTS

The following description refers to a method of determining the source of unwanted noises in an aircraft cabin. A method according to the invention can have other applications, however. For example, it can be used to identify a sound source in a road vehicle (automobile or truck) or to identify recorded sonar signals in the field of oceanography.

In the embodiment of a method according to the invention applied to detecting unwanted noises in an aircraft, it is first necessary to establish a database combining the signatures of characteristic noises generated by various sound sources. Each signature bears a name (for example, forward left-hand door seal) and includes four types of information: field of existence of the signature, range of frequencies, effect of parameter variations, and equipment redundancy. Note that the same source can have more than one signature, corresponding to different fields of existence.

Figure 1:
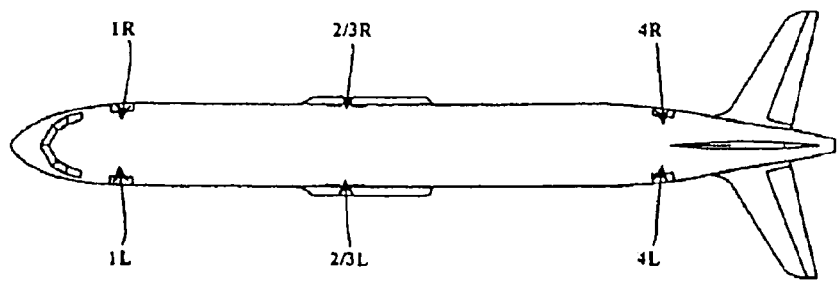
FIG. 1 is a diagrammatic plan view of an aircraft fuselage without its wings.

The information of the first type concerning the field of existence of the signature includes, for example:

Aircraft type;

Location: FIG. 1 shows six locations 1L, 1R, 2/3L, 2/3R, 4L and 4R in an aircraft corresponding to the locations at which microphones are installed to carry out measurements. The signature indicates the special location corresponding to the location at which the unwanted noise is perceived best;

Flight phase: this indicates if the unwanted noise occurs more during the climb phase, the descent phase, or at cruising altitude. This signature may refer to one or more flight phases;

N1 and N2: the signature indicates at which engine revs the corresponding unwanted noise appears;

Altitude (FL): the signature includes information on the altitudes at which the corresponding unwanted noise can be perceived;

Speed: the range of speeds in which the unwanted noise occurs is indicated; and

Pressure difference: this is the pressure difference between the exterior and the interior of the cabin at which the unwanted noise occurs.

The information of a signature concerning the range of frequencies includes, for example:

Minimum frequency and maximum frequency corresponding to the range of frequencies of the unwanted noise emitted by the corresponding sound source; and Harmonics: this indicates if the unwanted noise generated by the sound source is likely to include harmonics or not.

The signature also includes information on the effects of parameter variations. Such information includes, for example:

Effect of N1 on frequency;
Effect of N1 on level;
Effect of N2 on frequency;
Effect of N2 on level;
Effect of FL on frequency;
Effect of FL on level;
Effect of speed on frequency;
Effect of speed on level;
Effect of pressure difference on frequency; and
Effect of pressure difference on level.

For each parameter, the effect on the frequency or the level when that parameter (N1, N2, altitude, etc.) is increased is indicated. The signature then indicates if the frequency or the level is increasing, decreasing, stable, has no effect or has an unknown effect.

The information concerning equipment redundancy indicates if the signature has characteristics similar to another signature. In the present example, for the forward left-hand door seal there might be equipment redundancy vis vis the right-hand forward door seal.

All of the signatures are grouped together in a database referred to hereinafter as the signature base.

Figure 2:
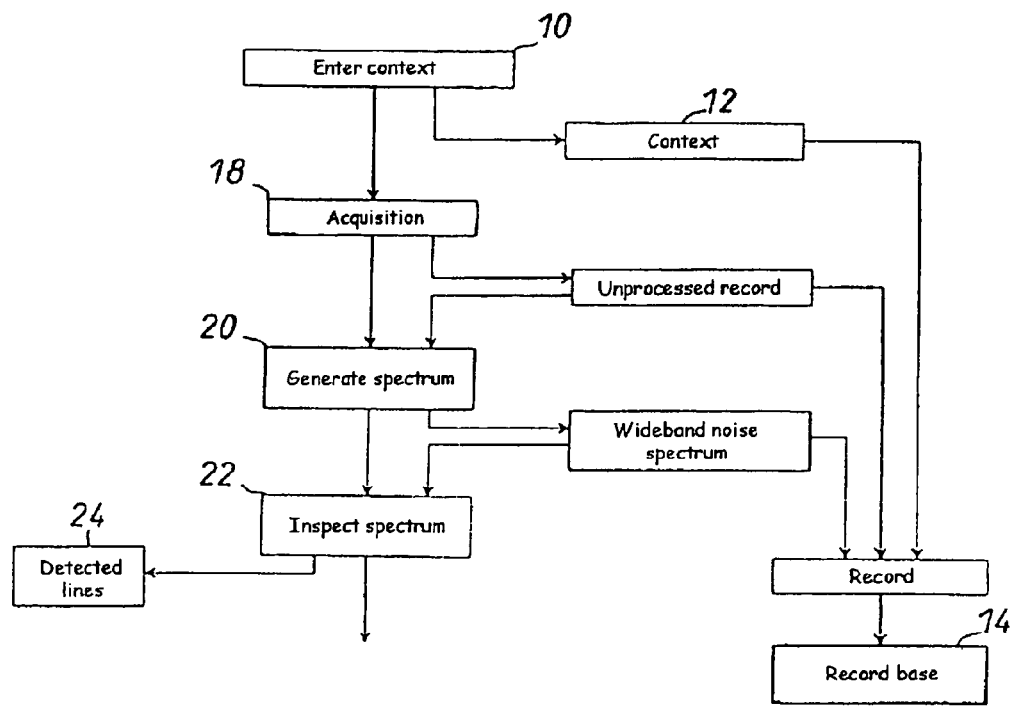
FIG. 2 shows diagrammatically the first steps of a method according to the invention.

FIG. 2 shows diagrammatically the first steps of one embodiment of a method according to the invention during which a sound recording is made and then analyzed. It is assumed here that the signature base has been established beforehand.

The method as described hereinafter is carried out in an aircraft during a test flight. In a preferred embodiment of the method, the aircraft is equipped with six microphones arranged in the cabin of the aircraft at the locations 1L, 1R, 2/3L, 2/3R, 4L and 4R indicated in FIG. 1. Microphones can also be provided in the cockpit of the aircraft. The microphones are connected to a microcomputer equipped with a suitable data acquisition card. The microcomputer includes an independent electrical power supply and is therefore not supplied with power by the electrical circuit of the aircraft. This makes the device used to implement the method according to the invention totally independent of the aircraft in which the measurements are carried out.

Figure 3:
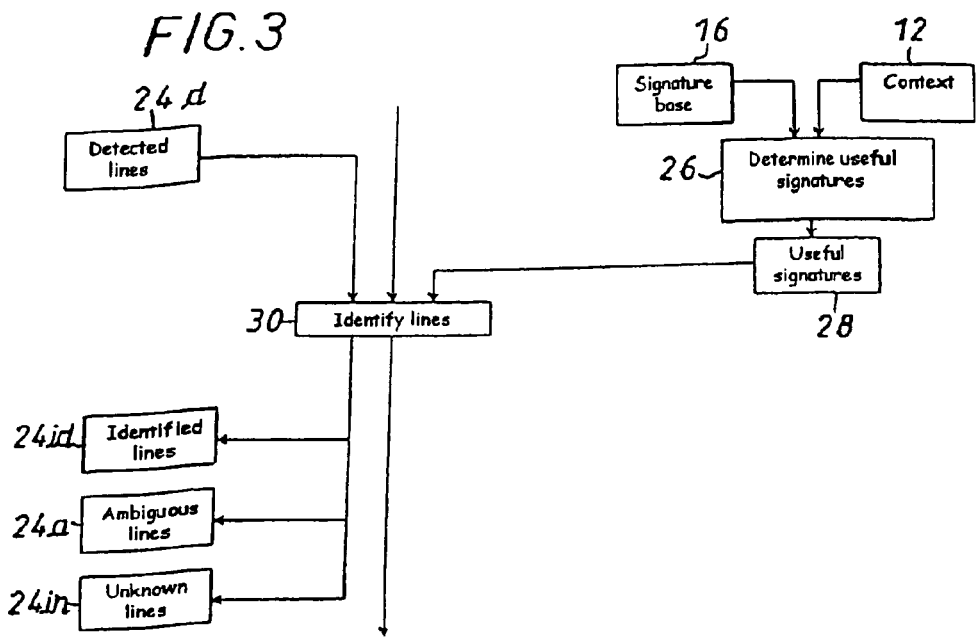
FIG. 3 shows diagrammatically a line identification step.

A first step consists of entering the context in which the recording will be made. The information 12 collected during this data entry step 10 is recorded and stored in a record base 14. Like the signature base 16 (FIG. 3), the record base 14 is stored in the microcomputer.

The information 12 constituting the context in which the recording is made includes, for example, the identification of the aircraft (type and registration) and the flight (flight number and date). This data is entered manually. The information 12 also includes flight parameters such as engine revs (values of N1 and N2), the aircraft speed/Mach number, the altitude, the flight phase (climb, cruising, descent), the pressure difference between the cabin and the atmosphere, etc. The parameters are indicated as accurately as possible.

The entry 10 of the information 12 concerning the context is followed by the acquisition 18 of a signal. This occurs during a stable flight phase, i.e. with stable flight parameters, except for the altitude, of course, if the data is acquired during the climb or descent phase. The acquisition step 18 takes a few seconds (for example 10 seconds) while the unwanted noise whose source is to be determined is established. Each sampled signal is stored in the microcomputer in the form of a ".WAV" file, for example. Calibration information for generating real acoustic values from this file is also stored.

Immediately after the acquisition step 18, the recorded signal is processed to obtain a spectrum (step 20). This spectrum is a representation of the amplitudes of the components of the complex sounds recorded as a function of frequency. To obtain this spectrum, the recorded signal is processed using a fast Fourier transform (FFT), for example with a Hanning window, A weighting and averaging of the spectra obtained to yield a unique spectrum to the Microsoft Excel (registered trade mark) format, for example. The A weighting applied to the spectrum represents the perception characteristics of the human ear. A non-weighted spectrum is also generated for correcting the picket fence effect. The wideband level is also estimated so that the emergent lines can be calculated. A power density spectrum (PDS) correction is applied to the emergent lines. There is no utility in describing in detail here the processing operations carried out because they are well known to the person skilled in the art of signal processing and other operations can equally well be carried out to obtain a spectrum of the recorded signal. The spectrum to the Microsoft Excel (registered trade mark) format and the corrected non-weighted spectrum are also stored in the record base 14.

FIGS. 10 to 13 show examples of spectra obtained after processing the signal sampled in step 18 and processed in step 20. These figures show a general trend of the curve representing background noise and peaks exceeding the background noise and known as emergent lines. The emergence (in dB) of these lines is determined by comparing the level at the peak of the line with the local wideband level.

The next step is a spectrum inspection step 22 which identifies the emergent lines. During step 22, only elements emerging significantly from the background noise are of interest. Thus one or more emergence thresholds are defined. For example, a "line present" threshold is set at 7 dB and an "abnormality" threshold is set at 13 dB.

During the inspection step 22, the spectrum is scanned in the increasing frequency direction to extract the emergent lines (allowing for the emergence thresholds indicated above). This extraction includes detection of harmonics, refined by applying picket fence correction and PDS correction to all the lines. Scanning the spectrum in the increasing frequency direction makes it possible to verify if an observed line is a harmonic of a line already detected or not.

The corresponding frequency, the emergence and the level of the line are noted for each line detected. All of the detected lines 24 are displayed in order of decreasing emergence, for example. Lines with an emergence of less than 7 dB are not displayed in the present example.

When the lines have been detected, they must be identified to determine if they correspond to a signature in the signature base 16. To avoid having to compare each line to all of the signatures contained in the signature base 16, a subset 28 of signatures referred to hereinafter as useful signatures is chosen as a function of the information 12 defining the context in which the recording was made. Only the signatures that are plausible in the given context are retained. For example, signatures corresponding to noises occurring at speeds greater than 300 knots are not retained if the speed during recording was below 300 knots.

The identification step 30 compares each detected line 24d extracted during the inspection of the spectrum to the useful signatures. Initially, the identification is based on the frequency. At this stage of the identification process, the lines from the set 24 of lines detected are distributed in the following manner:

identified line 24id: only one existing signature explains this line, and this signature does not correspond to any other line, ambiguous line 24a: more than one signature can explain this kind of line and/or more than one line is possible for the same signature, and unknown line 24in: there is no signature corresponding to this type of line.

Figure 4:
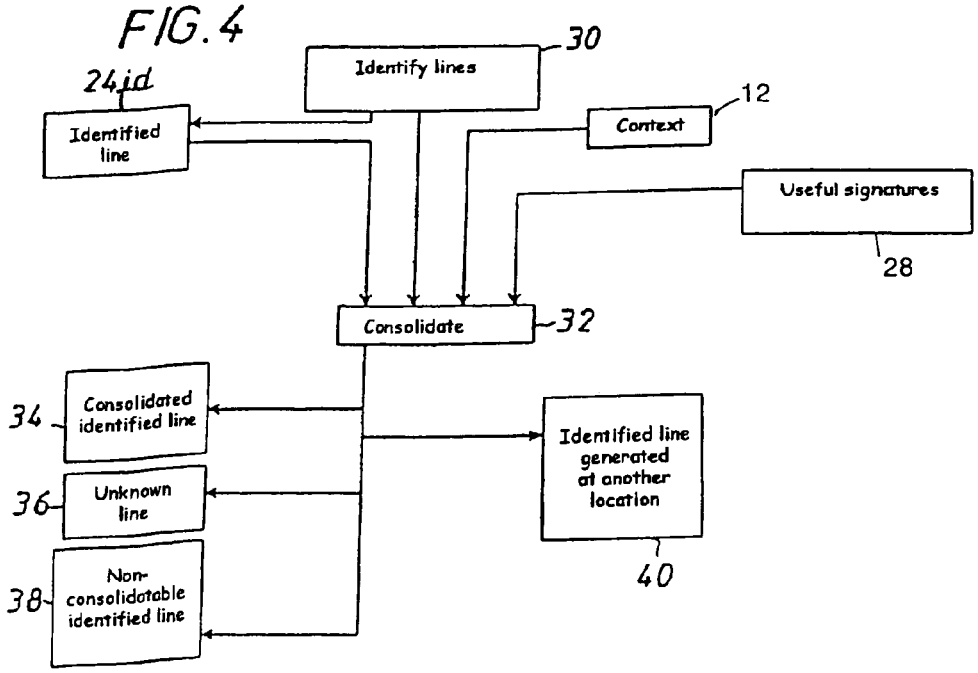
FIG. 4 shows diagrammatically a consolidation operation.

Each type of line is processed differently. Thus there is a consolidation step (see FIG. 4) for an identified line 24id, an unknown source quantification step for an unknown line 24in, and a resolving of ambiguity step (see FIG. 9) for an ambiguous line 24a.

There are two types of consolidation: location consolidation and behavior consolidation.

Location consolidation verifies that the observed line 24id is actually generated at the location where the measurement was taken. To perform this location consolidation, the location parameter is "released". All the signatures of known sources generated at another location in the aircraft are then chosen. From these signatures, those whose frequency ranges correspond to the line 24id are chosen and a measurement is performed at the special location of the signature. Note that if six recordings are made simultaneously, the results of this measurement are immediately available. If the same frequency is found at a lower level, then the line is actually generated at the location corresponding to the original measurement. In the contrary case, if a higher level is obtained at a different location for the same frequency, then the line is generated at the new location and not at that of the original measurement.

To perform a behavior consolidation, it is not the location for the measurement that is modified but another parameter of the context. For example, if in the definition of the signature an increase of frequency with speed is indicated, then it is verified that this increase actually occurs. A measurement is then carried out at a different speed to carry out the verification afterward.

The consolidation step includes one or more location consolidation steps and/or one or more behavior consolidation steps.

After the consolidation step, the identified line 24id is classified into one of the following subsets:

consolidated identified line (subset 34): the parametric behavior of the only existing signature explaining the line is verified, unknown line (subset 36): the expected behavior given the candidate signature is not verified, non-consolidatable identified line (subset 38): no parametric verification has been possible, and identified line generated at another location (subset 40).

Figure 5:
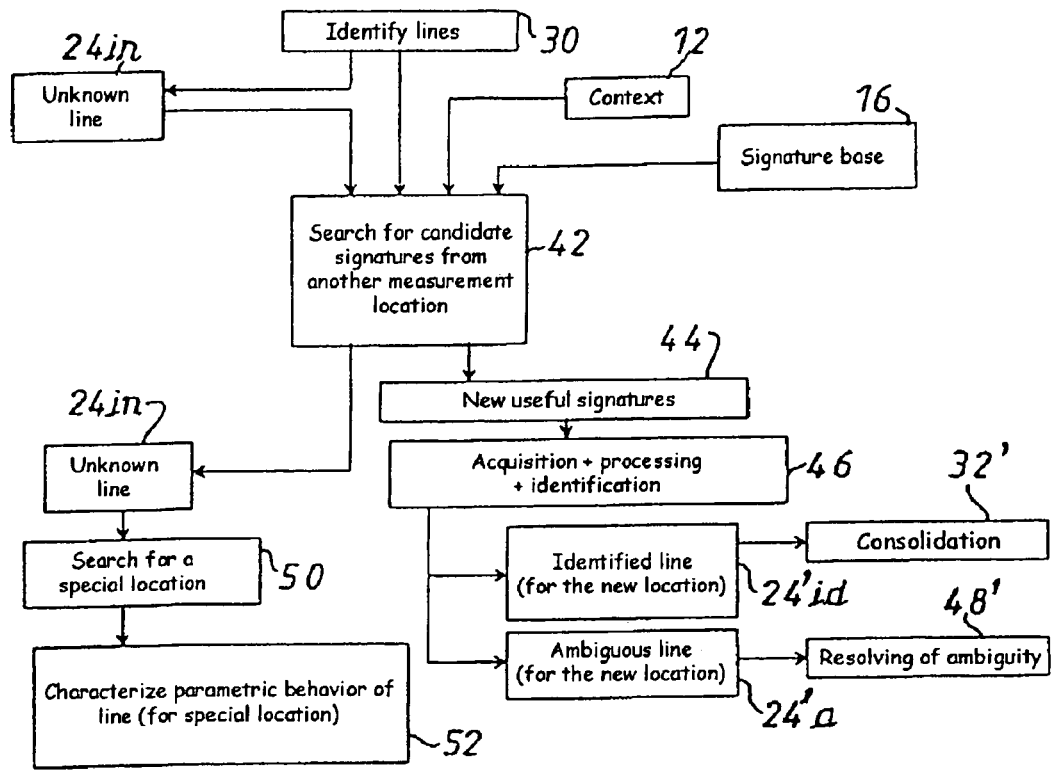
FIG. 5 shows diagrammatically an unknown source quantification operation.

FIG. 5 shows a step of unknown source quantification. During this quantification, a first action is to release the location parameter in order to choose all the signatures of known sources generated at another location in the aircraft. The signatures whose ranges of frequency correspond to the unknown line are then chosen (step 42). A new subset 44 of signatures is obtained. For these signatures, the special location of the signature is measured. This measurement entails signal processing as explained above (step 46). In this case, if the same frequency is found at a higher level, then the unknown line is identified. A line 24'id is then found which must subsequently be consolidated (step 32').

After step 46, it may be found that the line concerned is an ambiguous line 24'a. A resolving of ambiguity step 48' must then be carried out for the line 24'a.

It is equally possible for no signature to be found after the operation 42 of seeking signatures from another measurement location. The line then remains an unknown line 24 in. It is then necessary to look for the special location of the unknown line (step 50) by seeking the measurement point at which, with constant flight parameters, the level of the line concerned is the highest, and then to characterize the parametric behavior of the line for the special location by modifying one or more flight parameters (step 52). For example, a measurement can be taken at the special location when modifying the aircraft speed or engine revs.

Figure 6:
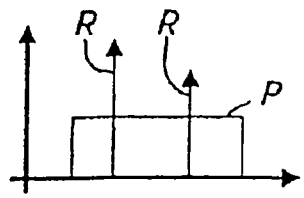
FIGS. 6 to 8 show diagrammatically three ambiguous lines.
Figure 7:
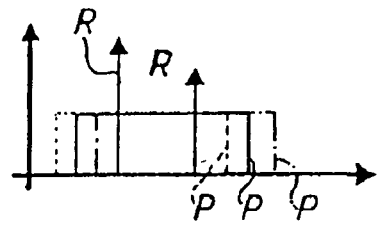
Figure 8:
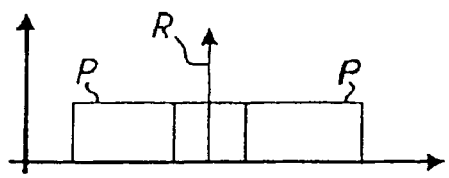

FIGS. 6 to 8 show various instances in which a line is ambiguous. In the first instance (FIG. 6), at least two lines R are present in a range of frequencies P of the same signature. In the second instance (FIG. 7), there are multiple sources generating the same noise: one or more lines R are found in the range of frequencies P of more than one signature. There is then equipment redundancy. In the third instance (FIG. 8), there is a line R in the range of frequencies P of at least two signatures.

Figure 9:
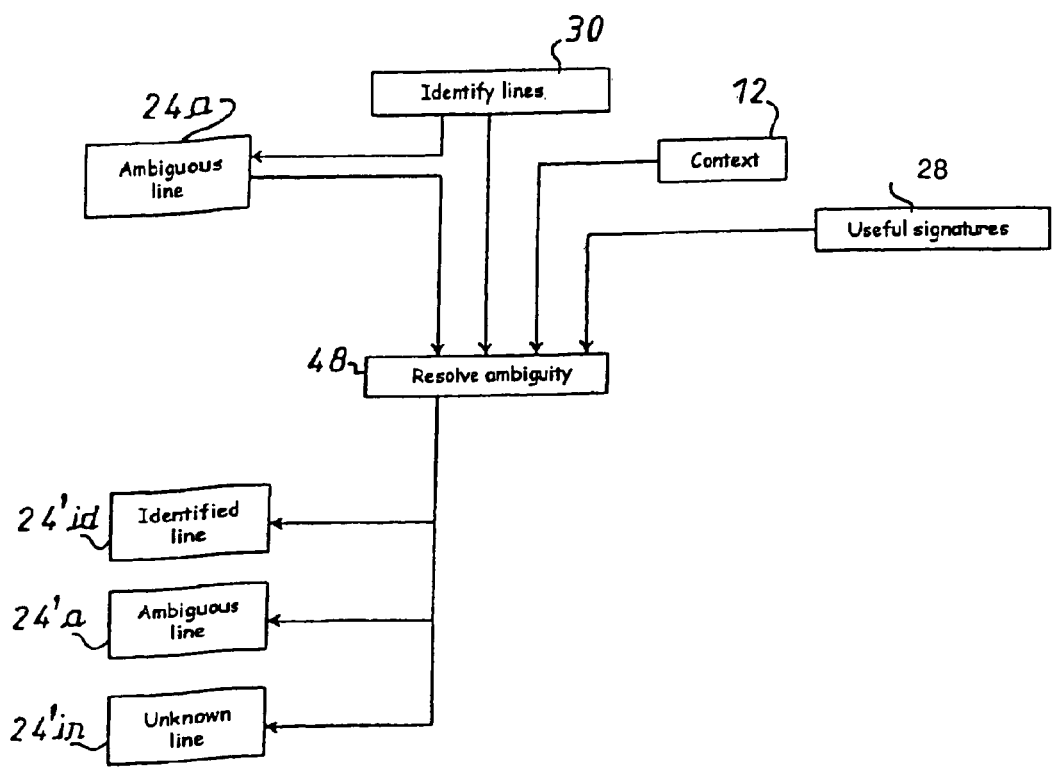
FIG. 9 shows diagrammatically an operation to remove ambiguity.

In all these instances, it is necessary to carry out a resolving of ambiguity step 48 (FIG. 9). Depending on the situations encountered, it is necessary to resolve the ambiguity by a change of location or by parameter variation.

The ambiguity is resolved by a change of location especially when an unwanted noise generated at a location other than the measurement location is sufficiently strong to be detected at the measurement location. In this case, the location parameter is released in order to choose all the signatures of known sources generated at another location in the aircraft. Here the signatures are chosen whose ranges of frequency correspond to the analyzed line and a measurement is carried out at the special location of the signature. If the same frequency is found at a higher level, then the line is generated at a location other than that of the original measurement.

To resolve the ambiguity by parameter variation, the frequency or level behavior is observed during parameter variation. The degree of freedom (parameter) to be changed is chosen automatically according to the behavioral characteristics of the candidate sources. This is because the signatures indicate to what extent a parameter influences the frequency or the level of the unwanted noise emitted.

In this case, the microcomputer proposes a new measurement. The new measurement is carried out after entering information concerning the context of the measurement. The spectrum obtained is analyzed and compared to the previous spectrum or spectra to resolve the ambiguity. For example, if one candidate source is sensitive to speed and the comparison of two spectra corresponding to different speeds shows no change, then that source can be set aside. Conversely, if only one of the ambiguous lines is sensitive to the modified parameter and only one of the candidate sources is sensitive to that parameter, then that source is declared to be the cause of the line.

The procedure is repeated in this way until the ambiguity is resolved. If it proves impossible to resolve the ambiguity, a specialist in acoustics must be called in.

After the step of resolving the ambiguity, the original ambiguous line 24 a becomes an identified line 24'id, an ambiguous line 24'a or an unknown line 24'in.

In the situation shown in FIG. 6, where there are two lines in the range of frequencies of a signature, the ambiguity must be resolved by a change of location and/or by parameter variation. In the case of equipment redundancy (FIG. 7), the ambiguity is resolved by means of a change of location. Finally, in the third situation, when the line is in the frequency range of two or more signatures, the ambiguity is resolved by changing location and/or parameter variation.

Of course, the microcomputer proposes parameter variations but in the present instance these cannot be put into practice unless the pilot of the aircraft agrees. Furthermore, some parameters are interrelated. Thus the values N1 and N2 concerning the motor revs are linked thermodynamically. Similarly, the altitude and the pressure difference between the interior and the exterior of the cabin are linked.

When the lines have been identified and the consolidation, resolving of ambiguity and quantification process has been carried out, the lines identified at the outset become consolidated lines, identified lines, ambiguous lines or unknown lines.

Figure 10:
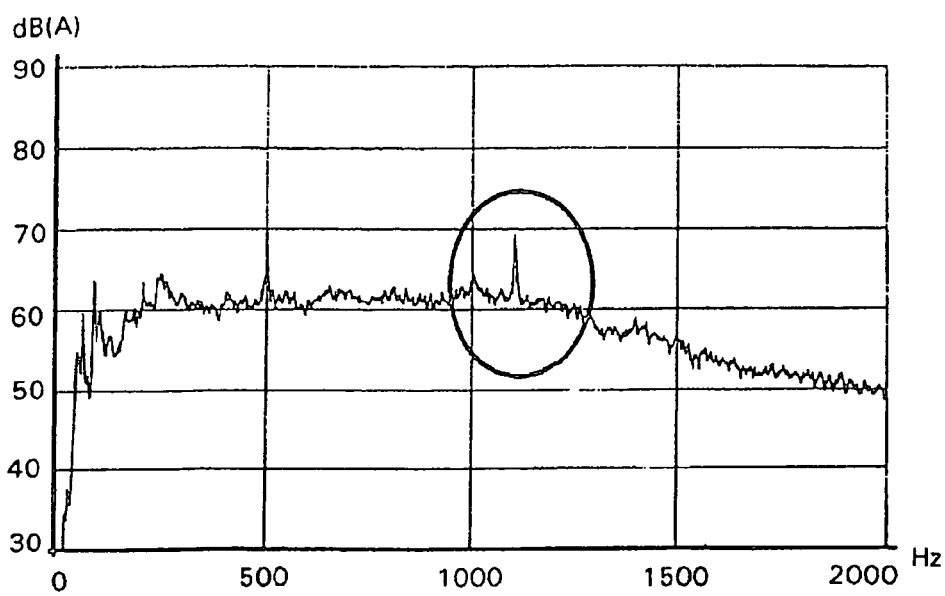
FIGS. 10 to 13 show spectra of signals recorded during execution of a method according to the invention.
Figure 11:
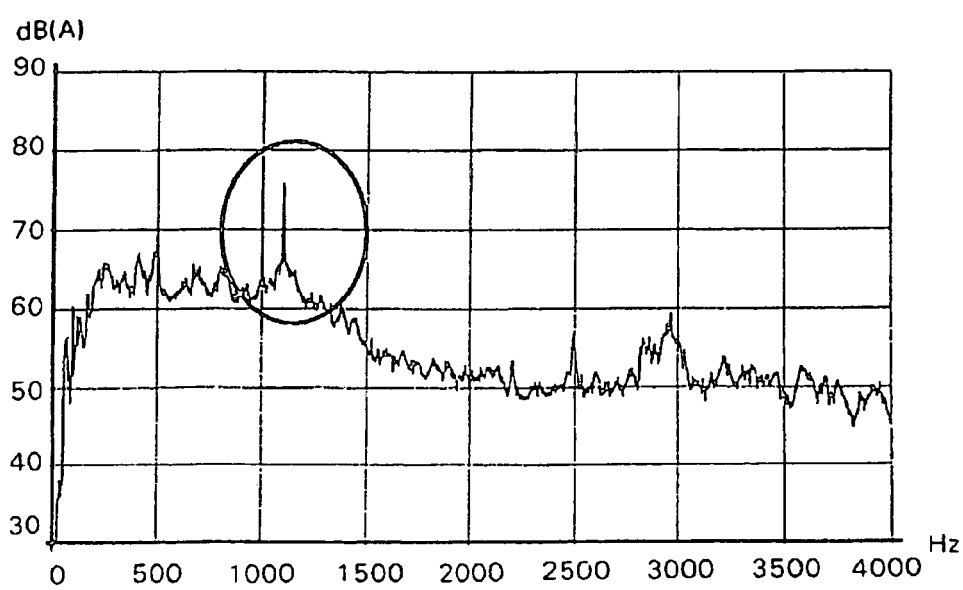

FIGS. 10 and 11 show one example of resolving ambiguity. FIG. 10 shows at a frequency of 1,100 Hz a line corresponding to a source A. The measurement shown in FIG. 10 was taken at location 2/3L, at an altitude of 13,000 feet and at a speed of 320 knots. This line therefore corresponds to a noise perceptible in the middle of the cabin. However, as shown in FIG. 11, this noise is generated in the aft area of the cabin. The measurement corresponding to FIG. 11 has the same characteristics except for the location. This measurement was taken at the location 4L, at an altitude of 13,000 feet and at a speed of 320 knots. Comparing the two figures shows that the level of the line is significantly different (69 dB in FIG. 10 and 76 dB in FIG. 11). Similarly, the emergence is much greater in FIG. 11 than in FIG. 10.

The remainder of the description gives a concrete example of the complete execution of a method according to the invention.

The aircraft represented in FIG. 1 is equipped with a microphone associated with a recorder and a microcomputer. The signature base 16 is stored in the microcomputer, on which software has been installed for implementing a method according to the invention.

The aircraft takes off for a test flight. An operator provides information requested by the microcomputer concerning the aircraft type and its registration. A noise that seems to be generated near the right-hand forward door has been detected and the measurement is therefore carried out at the location 1R.

The flight parameters are as follows:
Value of N1: 69%;
Value of N2: 72%;
Speech/Mach number: 300 knots/Mach 0.65;
Altitude: 20 000 feet;
Flight phase: cruising; and
Cabin/atmosphere pressure difference: 4 psi.

Figure 12:
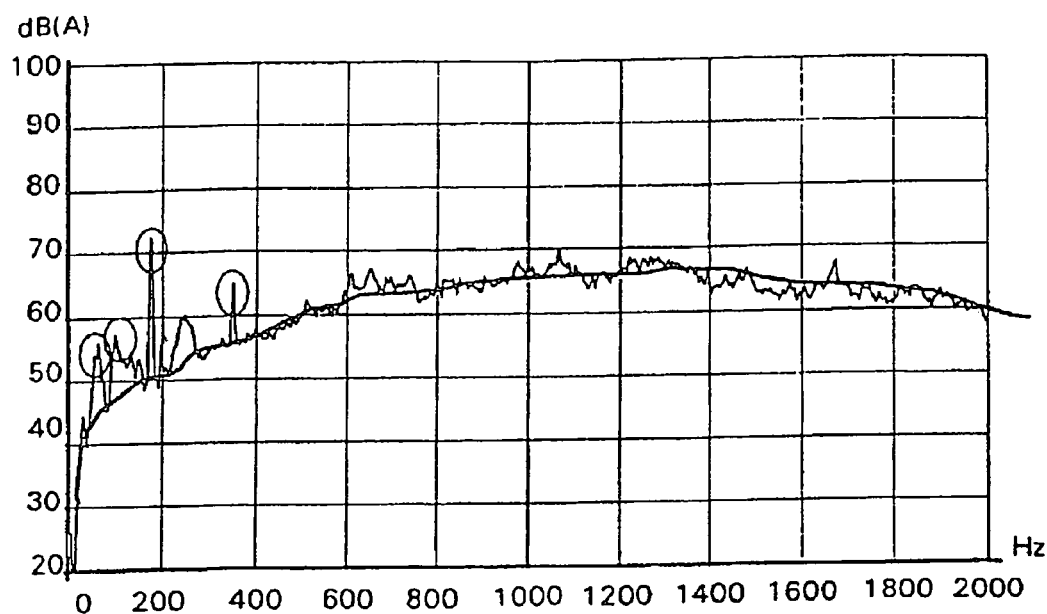

After making a recording lasting 10 seconds and processing the recorded signal, the spectrum shown in FIG. 12 is obtained. This spectrum is limited to the frequency range from 0 to 2 kHz because the measurement shows no significant component beyond 2,000 Hz.

The minimum emergence that can be determined is here set at 7 dB and the emergence indicating a problem is set at 13 dB. In increasing frequency order, FIG. 12 shows the following lines:
66 Hz: 10 dB emergence;
101 Hz: 8 dB emergence;
174 Hz: 23 dB emergence; and
First harmonic of preceding line: 10 dB emergence.

The wideband noise estimate is shown in bold in FIG. 12. For simplicity, the PDS and picket fence effect corrections are not included here.

During the identification procedure, six signatures are selected as verifying the data of the context. Only three of these signatures are explained hereinafter, but all of them are naturally taken into account during the analysis.

Signature S1:
Location: 1L, 1R, 2/3L, 2/3R, 4L, 4R (noise perceptible everywhere, no special location);
Flight phase: all;
N1: (65–70)%;
N2: all;
FL (altitude): all;
Speed: all;
Pressure difference: all;
Min frequency: 61 Hz;
Max frequency: 66 Hz;
Harmonics: none;
Effect of N1 on frequency: increasing;
Effect of N1 on level: unknown;
Effect of N2 on frequency: unknown;
Effect of N2 on level: unknown;
Effect of FL on frequency: unknown;
Effect of FL on level: unknown;
Effect of speed on frequency: unknown;
Effect of speed on level: unknown;
Effect of Mach number on frequency: unknown;
Effect of Mach number on level: unknown;
Effect of pressure difference on frequency: unknown;
Effect of pressure difference on level: unknown; and
Equipment redundancy: none.

Signature S2:
Location: all (noise perceptible everywhere, no special location);
Flight phase: all;
N1: all;
N2: all;
FL (altitude): all;
Speed: >260 knots;
Pressure difference: all;
Min frequency: 92 Hz;
Max frequency: 120 Hz;
Harmonics: possible;
Effect of N1 on frequency: unknown;
Effect of N1 on level: unknown;
Effect of N2 on frequency: unknown;
Effect of N2 on level: unknown;
Effect of FL on frequency: unknown;
Effect of FL on level: unknown;
Effect of speed on frequency: increasing;
Effect of speed on level: increasing;
Effect of Mach number on frequency: increasing;
Effect of Mach number on level: increasing;
Effect of pressure difference on frequency: unknown;
Effect of pressure difference on level: unknown; and
Equipment redundancy: none.

Signature S3 (Right-Hand Forward Door):
Location: 1R;

Flight phase: cruising;
N1: all;
N2: all;
FL (altitude): all;
Speed: all;
Pressure difference: all;
Min frequency: 167 Hz;
Max frequency: 187 Hz;
Harmonics: possible;
Effect of N1 on frequency: unknown;
Effect of N1 on level: unknown;
Effect of N2 on frequency: unknown;
Effect of N2 on level: unknown;
Effect of FL on frequency: unknown;
Effect of FL on level: unknown;
Effect of speed on frequency: unknown;
Effect of speed on level: unknown;
Effect of Mach number on frequency: unknown;
Effect of Mach number on level: increasing;
Effect of pressure difference on frequency: unknown;
Effect of pressure difference on level: unknown; and
Equipment redundancy: left-hand forward door.

These three signatures and a first analysis yield the following result:

| Line | Possible nature | Status |
| --- | --- | --- |
| 66 Hz (10 dB emergence) | S1 | Identified not consolidated |
| 101 Hz (8 dB emergence) | S2 | Identified not consolidated |
| 174 Hz (23 dB emergence) + 1st harmonic (10 dB emergence) | S3 | Ambiguous (equipment redundancy) |

The line having the greatest emergence has the highest priority for processing. It is an ambiguous line because of equipment redundancy. Because of this, a new measurement is carried out without modifying any of the flight parameters. The new measurement is carried out at the left-hand forward door without modifying any of the flight parameters. The context for this second measurement is therefore as follows:
Measurement location: 1L;
Value of N1: 69%;
Value of N2: 72%;
Speed/Mach number: 300 knots/Mach 0.65;
Altitude: 20 000 feet;
Flight phase: cruising; and
Cabin/atmosphere pressure difference: 4 psi.

Figure 13:
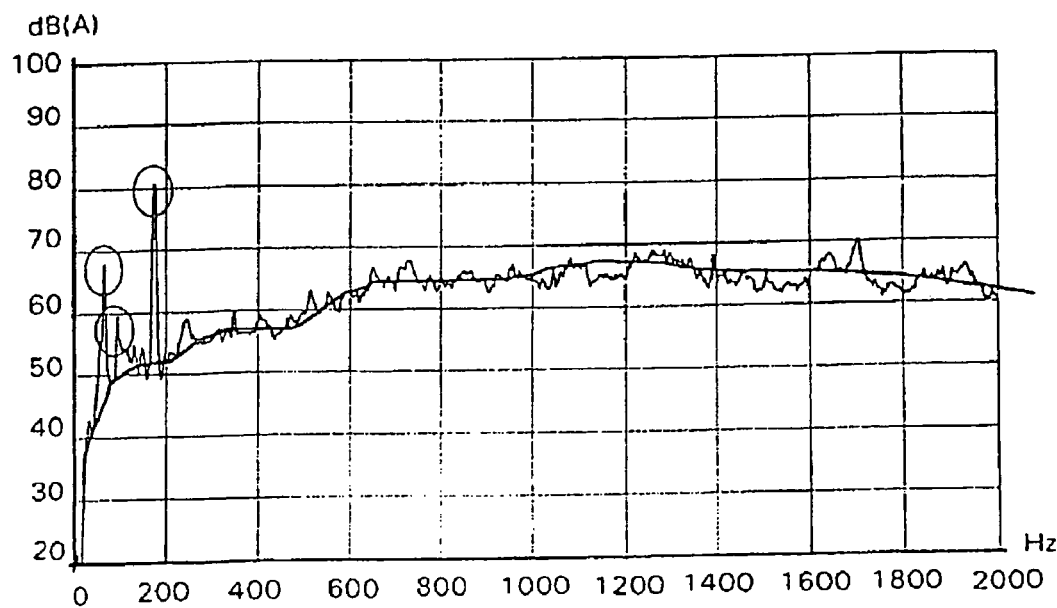

FIG. 13 shows the spectrum obtained after this second measurement. In this figure, as in FIG. 12, the wideband noise estimate is shown in bold. Also as in FIG. 12, the PDS and picket fence effect corrections are not taken into account here.

The new spectrum is inspected and new signatures corresponding to the left-hand forward door are selected, yielding the following table of results:

| Line | Possible nature | Status |
| --- | --- | --- |
| 65 Hz (20 dB emergence) | S1 | Identified not consolidated |
| 96 Hz (9 dB emergence) | S2 | Identified not consolidated |
| 174 Hz (31 dB emergence) | Left-hand forward door | Ambiguous (equipment redundancy) |

It can be seen that the noise at 174 Hz is the same as that for the right-hand forward door. The sound level observed for this noise is 81 dB for the left-hand forward door, as against 73 dB for the right-hand forward door. It is therefore declared that this noise is a left-hand forward door noise. The following result is then obtained:

| Line | Possible nature | Status |
| --- | --- | --- |
| 65 Hz (20 dB emergence) | S1 | Identified not consolidated |
| 96 Hz (9 dB emergence) | S2 | Identified not consolidated |
| 174 Hz (31 dB emergence) | Left-hand forward door | Identified not consolidated |

Given the signatures, it is determined that:
S1 is sensitive to a variation in the engine revs N1,
S2 is sensitive to a variation in the speed, and
the left-hand forward door is sensitive to a variation in the speed.

Given that the suspect left-hand forward door noise has the greatest emergence, a consolidation by parameter variation is performed, choosing the speed as the parameter.

The software proposes a 20 knots speed increase or reduction. The operator chooses an increase in speed and requests the pilot to increase the speed to 320 knots. To maintain the other parameters, the aircraft then begins a slight descent (although this is still regarded as a cruising phase). It is also possible to accept an increase in the motor revs and therefore in N1 and N2 and to maintain a constant altitude to produce a variation in N1 that could be used to consolidate the line at 65 Hz.

Finally, S1, S2 and the left-hand forward door are identified and consolidated. The sources of noise having been identified, action can be taken after the aircraft has landed.

The method described automatically identifies sources of unwanted noises in an aircraft. It is obvious that the method can be adapted to detect other unwanted noises, for example in an automobile, a truck or a coach. Applications outside the transportation field can of course be envisaged.

The present method has the advantage that it can be used without the intervention of an expert in acoustics.

In the examples described, one or more microphones and a microcomputer were installed on board an aircraft before carrying out a test flight to identify the source of the unwanted noises heard. It is also possible to envisage equipping an aircraft permanently with judiciously placed microphones. These then facilitate subsequent execution of the method, in particular when the aircraft is in operation with an airline.

The present invention is not limited to the embodiments described above by way of nonlimiting example. It also encompasses all variants within the scope of the following claims that will suggest themselves to the person skilled in the art.

Thus the present invention can be used, for example, to identify signals other than noises, for example vibrations. Instead of using microphones, one or more accelerometers are then installed on board the corresponding vehicle.

What is claimed is:
1. A system for identifying a signal source in a predetermined space, comprising:
a plurality of sensing units arranged at different locations of the predetermined space to detect signals in the predetermined space;

at least one recording unit connected to the sensing units and arranged to separately and simultaneously record a detected signal at each of the sensing units that detects the signal; and a processing unit configured to receive signal recordings from the at least one recording unit; the processing unit comprising:

a first storage area configured to store a set of identified signatures corresponding to a plurality of signal sources in the predetermined space;

a second storage area configured to store parameters related to the conditions under which the recordings of the signal are made; and an identifying unit, wherein:

the identifying unit is configured to:

determine a spectrum of the recorded signal;

detect a line emerging from background noise of the spectrum by using a predetermined emergence threshold;

compare the line with some or all of the signatures included in the set of identified signatures;

select at least one signature corresponding to the line to create at least one signature/line pair; and identify a source of the signal based on the created at least one signature/line pair.

2. The system of claim 1, wherein:
each sensing unit is arranged as one of an accelerometer and a microphone.

3. The system of claim 1, wherein:
the predetermined space includes at least one of an interior space of a transportation vehicle and components of the transportation vehicle.

4. The system of claim 3, wherein:
the processing unit includes an electrical power supply independent of an electrical power supply network of the vehicle.

5. The system of claim 3, wherein:
the vehicle is an aircraft; and
the plurality of sensing units is positioned in at least one of the cabin and cockpit of the aircraft.

6. The system of claim 3, wherein:
the plurality of sensing units is permanently attached to components of the vehicle.

7. A system for identifying a signal source in a predetermined space, comprising:

means for storing a set of identified signatures corresponding to a plurality of signal sources;

means for recording a signal simultaneously at different locations of the predetermined space;

means for storing parameters related to the conditions under which the recordings of the signal are made;

means for determining a spectrum of the signal;

means for detecting a line emerging from background noise of the spectrum by using a predetermined emergence threshold;

means for comparing the line with some or all of the signatures included in the set of identified signatures;

means for selecting at least one signature corresponding to the line to create at least one signature/line pair; and means for identifying a source of the signal based on the selecting step.

8. The system of claim 7, further comprising:
means for consolidating a signature/line pair when the selecting means results creates only one signature/line pair, the means for consolidating including:

means for modifying a measurement parameter;

means for comparing a recording corresponding to the modified parameter with the recording of the detected signal;

means for retaining the signature for the line if the signal is modified as predicted in the signature retained by modifying the parameter; and means for quantifying the source corresponding to the line if the signal is not modified as predicted in the signature retained by modifying the parameter.

9. The system of claim 7, further comprising:
means for resolving a signature/line pair ambiguity when the selecting step results in two or more signature/line pairs, the means for resolving including:

means for modifying a measuring parameter;

means for comparing a recording corresponding to the modified parameter with the recording of the detected signal;

means for analyzing the modification of the signal;

means for searching for signature/line pairs verifying a modification conforming to the observed modification;

means for retaining a signature for the line if only one signature/line pair verifies the observed modification;

means for restarting an ambiguity resolving process by modifying another parameter if a plurality of signature/line pairs verifies the modification; and means for quantifying the source corresponding to the line if no signature/line pair verifies the modification.

10. The system of claim 7, further comprising:
means for quantifying a source when the selecting step results in no signature/line pair, the means for quantifying including:

means for comparing the line with a greater number of signatures if the comparing step applied to only some of the signatures included in the set of identified signatures;

means for carrying out a consolidation process or an ambiguity resolving process if a signature is then found and depending on the number of signatures found; and means for carrying out additional measurements with different parameters if a signature is not found.

11. The system of claim 7, wherein the inventoried signatures include information related to:

the range of frequencies of the signal emitted by each corresponding source;

the conditions under which the signal emitted by each corresponding source is present; and the effects of modifying one or more parameters on the signal emitted by each source.

12. The system of claim 7, wherein:
the determining means processes the recorded signal by a fast Fourier transform to obtain a single spectrum by weighting and averaging.

13. The system of claim 7, wherein:
the determining means determines the spectrum of the signal by generating a non-weighted spectrum and applying a picket fence effect correction prior to weighting.

14. The system of claim 7, wherein:
the determining means applies a power density spectrum correction to emergent lines of the spectrum.

* * * * *

UNITED STATES PATENT AND TRADEMARK OFFICE
CERTIFICATE OF CORRECTION

PATENT NO. : 6,990,419 B2
DATED : January 24, 2006
INVENTOR(S) : Ramillon et al.

It is certified that error appears in the above-identified patent and that said Letters Patent is hereby corrected as shown below:

<u>Title page,</u>
Items [45] and [*] Notice, should read as follows:
-- [45] **Date of Patent: *Jan. 24, 2006**

[*] Notice: Subject to any disclaimer, the term of this patent is extended or adjusted under 35 U.S.C. 154(b) by 40 days.

This patent is subject to a terminal disclaimer. --.

Signed and Sealed this

Eighteenth Day of April, 2006

JON W. DUDAS
*Director of the United States Patent and Trademark Office*